United States Patent Office 3,423,367
Patented Jan. 21, 1969

3,423,367
ALKYLATED TERPOLYMERS
Ashot Merijan, Clark, and Frederick Grosser, Midland Park, N.J., assignors to GAF Corporation, New York, N.Y., a corporation of Delaware
No Drawing. Continuation-in-part of application Ser. No. 358,406, Apr. 8, 1964. This application Feb. 7, 1966, Ser. No. 525,374
U.S. Cl. 260—66          12 Claims
Int. Cl. C08f 7/12; C08f 7/14

ABSTRACT OF THE DISCLOSURE

Alkylated terpolymers ranging from viscous liquids to waxy solids which are soluble in organic polar and nonpolar solvents are provided by the simultaneous terpolymerization and alkylation process which involves heating one mole of a mixture of monomers containing from about 5 to 99 mole percent of a 5- to 7-membered heterocyclic N-vinyl monomer having a carbonyl function adjacent to the nitrogen in its heterocyclic moiety and from about 1 to 95 mole percent of a monoethylenically unsaturated polymerizable monomer other than $\alpha$-olefin with 0.05 to 10 moles of $\alpha$-unsaturated olefin comonomer selected from the class consisting of $\alpha$-olefin of from 2 to about 180 carbon atoms, monohalo- and polyhalo-$\alpha$-olefin of from 2 to 6 carbon atoms in solution of an organic solvent common to said mixture of monomers and $\alpha$-unsaturated olefin monomers in the presence of 0.025 to 0.30 mole of an organic peroxide catalyst per mole of said $\alpha$-unsaturated olefin comonomer at a temperature ranging from 80 to 200° C.

This application is a continuation-in-part of our application Ser. No. 358,406, filed on Apr. 8, 1964, now abandoned.

This invention relates to a new and useful class of alkylated terpolymers and to the process of preparing the same.

It is the principal object of the present invention to provide a new class of alkylated terpolymers of heterocyclic N-vinyl monomers, monoethylenically unsaturated polymerizable monomers and $\alpha$-olefins or halo-$\alpha$-olefins having varying degrees of solubility in polar and nonpolar solvents.

A further object is to provide a new process of simultaneously terpolymerizing and alkylating a mixture containing heterocyclic N-vinyl monomer, monoethylenically unsaturated polymerizable monomer and an $\alpha$-olefin or halo-$\alpha$-olefin, or a mixture of two different heterocyclic N-vinyl monomers and $\alpha$-olefin or halo-$\alpha$-olefin, so as to systematically control the solubility of the alkylated terpolymers. Thus, by the choice of two polymerizable monomers and $\alpha$-olefin or halo-$\alpha$-olefin, it is possible to prepare alkylated terpolymers which are soluble in polar solvents, such as alcohols, but which are much less sensitive to moisture, or polymers which are soluble in aliphatic hydrocarbons of from 6 to 60 carbon atoms including isomers thereof, mineral and lubricating oils having a Saybolt viscosity of from 50 to 200 seconds, or terpolymers having intermediate degrees of solubility between polar and non-polar solvents.

Other objects and advantages will become manifest from the following description.

We have found that alkylated terpolymers are readily obtained by heating one mole of a mixture of monomers containing from 5 to 99 mole percent of a heterocyclic N-vinyl monomer having a carbonyl function adjacent to the nitrogen in its heterocyclic moiety and from 1 to 95 mole percent of a polymerizable monoethylenically unsaturated monomer with 0.05 to 10 moles of an $\alpha$-olefin or halo-$\alpha$-olefin of at least 2 carbon atoms in solution of an inert organic solvent common to the mixture of monomers and $\alpha$-olefin or halo-$\alpha$-olefin in the presence of 0.025 to 0.30 mole of an organic peroxide catalyst per mole of $\alpha$-olefin or halo-$\alpha$-olefin at a temperature ranging from 80° C. to 200° C. for a period of time of from 3 to 60 hours.

The new and unexpected feature of the foregoing reaction is that the same $\alpha$-olefin or halo-$\alpha$-olefin which forms the terpolymer, alkylates one or more active sites of the heterocyclic N-vinyl monomer moieties as well as one or more active sites in the polymerizable monoethylenically unsaturated comonomer in the terpolymer. In other words, the $\alpha$-olefin or halo-$\alpha$-olefin terpolymerizes with the heterocyclic N-vinyl monomer and the monoethylenically unsaturated monomer. While the three (3) component mixture is being terpolymerized, the same $\alpha$-olefin or halo-$\alpha$-olefin also alkylates one or more of the active sites of the heterocyclic N-vinyl monomer moiety as well as the other comonomer in the terpolymer by an alkyl or haloalkyl group of the number of carbon atoms contained in the $\alpha$-olefin or halo-$\alpha$-olefin employed in the reaction. This feature will be discussed in more detail hereinafter.

The solution of the alkylated terpolymer obtained as above may be employed as such, or, if desired, the inert organic solvent may be removed by vacuum distillation, or other solvent evaporation techniques.

The heterocyclic N-vinyl monomers which are simultaneously terpolymerized with a polymerizable monoethylenically unsaturated monomer and $\alpha$-olefin or halo-$\alpha$-olefin and one or more of the heterocyclic N-vinyl monomer moieties alkylated with the $\alpha$-olefin or halo-$\alpha$-olefin in accordance with the present invention include N-vinyl succinimide, N-vinyl diglycolylimide, N-vinyl glutarimide, N-vinyl-3-morpholinone, N-vinyl-5-methyl - 3 - morpholinone, N-vinyl-5-ethyl-3-morpholinone, N-vinyl oxazolidone; N-vinyl lactams of the formula:

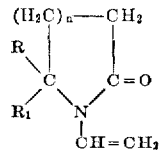

wherein R and $R_1$ are selected from the group consisting of hydrogen, methyl, and ethyl, and $n$ is an integer of from 1 to 3. Such monomers include N-vinyl pyrrolidone,
N-vinyl-5-methyl pyrrolidone,
N-vinyl-5-ethyl pyrrolidone,
N-vinyl-5,5-dimethyl pyrrolidone,
N-vinyl-5,5-diethyl pyrrolidone and
N-vinyl-5-methyl-5-ethyl pyrrolidone;
N-vinyl piperidone,
N-vinyl-6-methyl piperidone,
N-vinyl-6-ethyl piperidone,
N-vinyl-6,6-dimethyl piperidone,
N-vinyl-6,6-diethyl piperidone and
N-vinyl-6-methyl-6-ethyl piperidone;
N-vinyl caprolactam,
N-vinyl-7-methyl caprolactam,
N-vinyl-7,7-dimethyl caprolactam,
N-vinyl-7-ethyl caprolactam,
N-vinyl-7,7-diethyl caprolactam and
N-vinyl-7-methyl-7-ethyl caprolactam, as described in United States Patents 2,265,450; 2,317,-804; 2,335,454 and many others too numerous to mention in which working examples of some of the species characterized by the above formula are given.

Another group of heterocyclic N-vinyl monomers comprises comparable monomers of the corresponding N-vinyl 5-, 6- and 7-membered thiolactams, i.e., wherein oxygen in the foregoing formula is replaced by sulfur.

Still another group of N-heterocyclic monomers includes polymerizable monomers, obtained by the reaction of 5-, 6- and 7-membered lactams with acryloyl or methacryloyl chloride or bromide in the presence of a hydrogen halide acceptor such as pyridine, dimethylaniline, etc., having the structure:

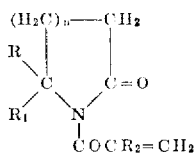

wherein R, and $R_1$, and $n$ have the same values as above, and $R_2$ is either hydrogen or methyl. Illustrative compounds are N-methacryloyl-pyrrolidone, -piperidone and -caprolactam; N-methacryloyl-5-methylpyrrolidone, N-methacryloyl-6-methyl-piperidone and N-methacryloyl-7-methyl caprolactam; N-acryloyl-pyrrolidone, -piperidone and -caprolactam; N-acryloyl-5-methylpyrrolidone, N-acryloyl-6-methylpiperidone and N-acryloyl-7-methyl caprolactam; compounds having the structure:

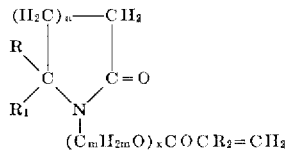

wherein R, $R_1$ and $n$ have the same values as above, $R_2$ is either hydrogen or methyl, $x$ is an integer of from 1 to 4, and $m$ is an integer of from 1 to 4 when $x$ has a value of 1 and from 2 to 4 when $x$ has a value greater than 1. Illustrative compounds are N-acryloxymethyl-pyrrolidone, -piperidone and -caprolactam; N-methacryloxyethoxyethyl-pyrrolidone, -piperidone and -caprolactam; N-methacryloxypropyl-pyrrolidone, -piperidone and -caprolactam; N-methacryloxymethyl-5-pyrrolidone, -piperidone and -caprolactam; N-methacryloxyethyl-5-pyrrolidone, -piperidone and -caprolactam; N-methacryloxymethyl-5-methyl-pyrrolidone, -6-methylpiperidone and -7-methylcaprolactam, including acrylamido- and methacrylamido-lactams of the structure:

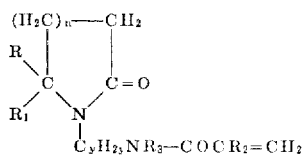

wherein R, $R_1$ and $n$ have the same values as above, $R_2$ is either hydrogen or methyl, $R_3$ represents hydrogen, an alkyl of from 1 to 4 carbon atoms or phenyl group and $y$ represents an integer of from 1 to 3. Illustrative compounds of this type are N-methacrylamido-methyl-, N-methacrylamidoethyl-, N-methacrylamidopropyl- and N-(N-phenylacrylamidopropyl)-pyrrolidones, -piperidones and -caprolactams, which are readily prepared by reacting acryloyl or methacryloyl chloride or bromide with an N-(aminoalkyl)-lactam in the presence of any conventional base to take up the hydrogen halide.

It is to be understood that the nature or character of the N-heterocyclic polymerizable monomer that may be used in the process of the present invention is immaterial so long as it contains a carbonyl function in the ring adjacent to the nitrogen atom thereof and also contains at least one active proton in its monomer moiety. Such monomer will terpolymerize with the polymerizable monoethylenically unsaturated monomer and α-olefin or halo-α-olefin and alkylate with the said α-olefin or halo-α-olefin as will be pointed out hereinafter.

As noted above, one mole of a mixture consisting of from 5 to 99 mole percent of any one of the foregoing monomers and from 1 to 95 mole percent of a different N-heterocyclic polymerizable monomer may be terpolymerized with the α-olefin or halo-α-olefin in which case the terpolymer will contain two N-heterocyclic moieties capable of alkylation at one or more active sites in said moieties.

Any α-olefin, i.e., acyclic α-unsaturated hydrocarbon, htving a molecular weight from about 28 to as high as 2500 may be employed as the terpolymerizing monomer and in the alkylation of the active sites in the moieties of the N-heterocyclic monomers as well as one or more active sites in the polymerizable monoethylenically unsaturated comonomer during the simultaneous terpolymerization and alkylation reaction. In other words, α-olefins ranging from ethene (ethylene) to as high as polybutenes having molecular weights from 400 to 2500 may be employed. As examples of such α-olefins, the following are illustrative:

| | |
|---|---|
| ethene; | 1-octene; |
| propene; | 1-nonene; |
| 1-butene; | 2-ethyl-1-hexene; |
| 1-pentene; | 1-decene; |
| 2-ethyl-1-butene; | 1-dodecene; |
| 2-methyl-1-pentene; | 1-tetradecene; |
| 1-hexene; | 1-hexadecene; |
| 5-methyl-1-hexene; | 1-heptadecene; |
| 2-methyl-1-pentene; | 1-octadecene; |
| 1-hexene; | 1-nonadecene; |
| 5-methyl-1-hexene; | 1-eicosene; |
| 2-methyl-1-pentene; | 1-docosene; |
| 3-ethyl-1-pentene; | 1-tetracosene; |
| 1-heptene; | 1-pentacosene; | trimerized α-tetradecene and polybutenes of molecular weight of 400 to 2500 may be used.

While linear α-olefins are preferred because of their commercial availability, numerous isomers of α-olefins ranging from 1-pentene to 1-pentacosene as well as polybutenes may also be employed in the reaction. The only precaution required in such case is that the isomer contain an ethylenic unsaturation in the α-position thereof.

A mixture of commercially available linear α-olefins produced by cracking petroleum wax or by polymerizing lower olefins may also be used as the co-monomer and alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight-chain α-olefins; from <0.5 to 2 weight percent of straight-chain internal olefins; from 13 to 3 weight percent of branched and naphthenic olefins; from 2 to 4 weight percent of paraffins and naphthenes and from 1 to <1 of aromatics, respectively. A mixture of α-olefins containing from 65–75% of α-olefins of from $C_{20}$ to $C_{42}$ and having an average molecular weight of 366 is also commercially available and such mixture is employed in the reaction.

Instead of employing ethylene (ethene) as the co-monomer and alkylating agent, monohalo-α-olefins and polyhalo-α-olefins of at least 2 carbon atoms (previously and hereinafter referred to simply as halo-α-olefins), such as, for example, dichlorovinylidene fluoride ($CCl_2=CF_2$), chlorovinylidene fluoride ($CHCl=CF_2$), chlorotrifluoroethylene ($CClF=CF_2$), tetrafluoroethylene ($CF_2=CF_2$), tetrachloroethylene ($CCl_2=CCl_2$), vinylidene fluoride ($CH_2=CF_2$), vinylidene chlorofluoride ($CH_2=CClF$), 1,2-dichloro-1,2-difluoroethylene ($CClF=CClF$)

1,2-difluoroethylene ($CHF=CHF$), 1-chloro-2-fluoroethylene ($CHF=CHCl$), 1-dichloro-2-fluoroethylene ($CHF=CCl_2$), trichloroethylene ($CHCl=CCl_2$), trifluoroethylene ($CF_2=CHF$), 1-dichloro-2-difluoroethylene ($CF_2=CCl_2$), 1-chloro-2-difluoroethylene ($CF_2=CHCl$)

1-dichloro-2-difluoroethylene ($CF_2=CCl_2$), fluorotrichloroethylene ($CCl_2=CClF$), allyl chloride
($CH_2=CH-CH_2Cl$)
4-chloro-1-butene ($CH_2=CH-CH_2-CH_2-Cl$), 3,3,4,4-pentafluoro-1-butene ($CH_2=CH-CF_2-CF_3$), 5-chloro-1-pentene ($CH_2=CH-CH_2-CH_2-CH_2Cl$), 3,3,4,4,5,5,5-heptafluoro-1-pentene ($CH_2=CH-CF_2CF_2CF_3$)

3,3,4,4,5,5,6,6,-nonafluoro-1-hexene
($CH_2=CH-CF_2-CF_2-CF_2-CF_3$)

etc., may be used to yield a series of a new class of monohaloalkylated and polyhaloalkylated terpolymers.

It is to be noted that both the carbon chain length and the number of halogen substituents on the carbon atoms of the above halo-α-olefins are immaterial so long as the monohalo- and polyhalo-α-olefins contain an ethylenic unsaturation in alpha-position. Accordingly, the chain length of such halo-α-olefins may range beyond 6 carbon atoms.

The polymerizable monoethylenically unsaturated monomers which are terpolymerized with the N-heterocyclic monomer and α-olefin or halo-α-olefin include vinyl esters such as vinyl acetate, vinyl propionate, vinyl butyrate, vinyl isobutyrate, vinyl lactate, vinyl caproate, vinyl caprylate, vinyl oleate, and vinyl stearate and halo-substituted vinyl esters; acrylonitrile; styrene; 2-vinyl pyridine, 4-vinyl pyridine; allyl alcohol, allylamine, allyl cyanide, vinyl cyclohexane; acrylic acid; acrylate ester monomers of the formula $CH_2=CHCOOR_4$ wherein $R_4$ represents either a straight or branched alkyl of from 1 to 18 carbon atoms or an alkoxyalkyl in which the total number of carbon atoms in the alkyl groups range from 3 to 6.

As examples of acrylate esters having the above formula, the following are illustrative: methyl, ethyl, propyl, isopropyl, butyl, isobutyl, s-butyl, 2-methyl-1-butyl, 3-methyl-1-butyl, 2-ethyl-1-butyl, amyl, 3-pentyl, 2-methyl-1-pentyl, 4-methyl-2-pentyl, hexyl, 2-ethylhexyl, heptyl, 2-heptyl, octyl, 2-octyl, nonyl, 5-ethyl-2-nonyl, decyl, 2-methyl-7-ethyl-4-undecyl, dodecyl, tetradecyl, hexadecyl, octadecyl, 2-methoxyethyl, 2-ethoxyethyl and 2-butoxyethyl acrylate; methacrylic monomers such as methacrylic acid, methyl methacrylate, cyclohexyl methacrylate, isobutyl methacrylate, isoamyl methacrylate, β-methoxy ethyl methacrylate and α-(o-chlorophenyl) ethyl methacrylate, β-phenoxyethyl methacrylate, α-phenylethyl methacrylate, phenyl methacrylate, o-cresyl methacrylate, p-cyclohexyl-phenyl methacrylate, 2-nitro-2-methyl propyl methacrylate, di-ethylaminoethyl methacrylate, ethylidene acetate methacrylate and glycidyl methacrylate, including esters of halo acrylic acids, such as methyl-α-chloroacrylate, ethyl-α-chloro-acrylate, phenyl-α-chloro-acrylate, α-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N-dimethyl acrylamide, N,N-diethyl acrylamide, N,N-di-n-butyl acrylamide, N,N-di-isobutyl acrylamide, N-cyclohexyl acrylamide, N,N-dicyclohexyl acrylamide, N-phenyl acrylamide, N-p-nitro-phenyl acrylamide, N-α-naphthyl acrylamide, N-β-naphthyl acrylamide, N-methyl-N-phenyl acrylamide, N,N-diphenyl acrylamide, N-benzyl acrylamide, N,N-dibenzyl acrylamide; vinyl alkyl ketones; and grafted monomers of the type disclosed in United States Patents 3,029,219, 3,035,009, and 3,036,033.

It is to be noted that any mixture of monomers containing as low as 5 mole percent of a heterocyclic N-vinyl monomer and 95 mole percent of a polymerizable monoethylenically unsaturated monomer and which mixture is soluble in the inert organic solvent will undergo the simultaneous terpolymerization and alkylation with α-olefins or halo-α-olefins in accordance with the present invention.

From our study of the results of numerous experiments connected with the present invention, we found that the configuration of the foregoing polymerizable monoethylenically unsaturated monomers, and numerous others, is immaterial since they all are soluble in the inert organic solvent or mixture thereof and are simultaneosly terpolymerized with the heterocyclic N-vinyl monomer and α-olefin or halo-α-olefin.

It is to be further noted that in lieu of such a mixture, a mixture of two different heterocyclic N-vinyl monomers may be employed. Such mixture may contain from 5 to 99 mole percent of any one of the aforementioned heterocyclic N-vinyl monomer, or their obvious equivalents, and from 1 to 95 mole percent of another heterocyclic N-vinyl monomer. A mixture of two heterocyclic N-vinyl monomers will contain ample protons in the heterocyclic rings for a higher degree of alkylation during the simultaneous terpolymerization and alkylation reaction.

Where insolubility in water is desired, it is preferred that a monomer mixture be employed in which the heterocyclic N-vinyl monomer be present in an amount not less than 5 mole percent, based on the moles of said comonomer mixture. A monomer mixture within this range will contain sufficient active protons in the heterocyclic N-vinyl ring for alkylation—during the simultaneous polymerization and alkylation procedure—to yield alkylated terpolymers which are insoluble in water, but soluble in organic solvents of the type in which the copolymer, i.e, the comonomer mixture copolymerized in accordance with conventional procedure, is initially soluble.

In carrying out the simultaneous terpolymerization and alkylation reaction, an organic solvent is employed which is common to the alpha-olefin, halo-α-olefin, the heterocyclic N-vinyl monomer and the polymerizable monoethylenically unsaturated monomer. As solvents, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other solvents such as diethylene glycol, ethylene glycol monomethyl ether and the like may also be employed. It is to be noted that the nature or character of the organic solvent is immaterial so long as it forms a solution with the heterocyclic N-vinyl monomer, alphaolefin(s), halo-α-olefin(s), and the polymerizable monoethylenically unsaturated monomer, and is relatively inert toward alkylation.

The amount of inert organic solvent employed is not critical. Any amount which will yield a solution of the mixture of the two monomers and alpha-olefin or halo-α-olefin will suffice. However, for purposes of expediency, we found that for every part by weight of said mixture, from one to ten parts of organic solvent, either by volume or by weight, are sufficient to yield a workable solution.

As peroxide catalysts (initiator) for the polymerization and alkylation reaction, any one of the known tertiary-alkyl organic peroxides and hydroperoxides such as, for example, di-t-butyl peroxide, t-butyl perbenzoate, di-t-butyl perphthalate, t-butyl-pentamethyl-ethyl peroxide, t-butyl-triphenylmethyl peroxide, di-t-amyl peroxide, bis-(triethylmethyl) peroxide, bis-(triphenylmethyl) peroxide, 2,5-dimethyl-hexyl-2,5-dihydroperoxide, 2,5-dimethyl-2,5-di(t-butyl peroxy) hexane, 2,5-dimethylhexyl-2,5-di(peroxy benzoate), t-butyl hydroperoxide, paramenthane hydroperoxide, t-butyl peroctoate and the like may be used.

Where it is desired that the alkylated terpolymer be supplied as a solution in a mineral oil or lubricating oil of a paraffinic stock, the simultaneous terpolymerization and alkylation reaction is conducted in the presence of any one of the foregoing solvents. When the desired degree of terpolymerization and alkylation has been obtained, the reaction mixture is subjected to vacuum distillation and the removed solvent is replaced by a saturated aliphatic hydrocarbon having a boiling point higher than the solvent. After the initial solvent has been removed there is obtained a solution of the alkylated terpolymer in solution of the aliphatic hydrocarbon. Saturated aliphaitc hydrocarbons having a boiling point higher than solvents are legion and commercially available. Hence, no difficulty should be encountered in the selection of such hydrocarbon in preparing a solution of the alkylated terpolymer.

When low-boiling $\alpha$-olefins of from 2 to 6 carbon atoms or low-boiling halo-$\alpha$-olefins are employed in the reaction, in such case the organic peroxide catalyst, preferably di-t-butyl peroxide, and the solution of the monomer mixture are added into a stainless steel rocker bomb. The low-boiling $\alpha$-olefin or halo-$\alpha$-olefin is then charged to the bomb and the bomb heated and maintained at the same temperature and period of time as noted above. The pressure developed in the bomb may range from 100 to 1000 p.s.i.g. After cooling the contents of the bomb to room temperature, they are discharged into any suitable distillation equipment to remove the solvent and volatiles and the residual product recovered either as a solid ranging from a waxy to crystalline solid, or as a viscous liquid.

The percent of the $\alpha$-olefin or halo-$\alpha$-olefin consumed in the simultaneous terpolymerization and alkylation reaction ranges from 50% to 100% of the $\alpha$-olefin or halo-$\alpha$-olefin charged. It is to be noted that in this reaction some homopolymerization of the $\alpha$-olefin or halo-$\alpha$-olefin takes place to the extent of 5 percent of the olefin consumed as determined by solvent extractions and thermal gravimetric analysis (TGA).

The degree of terpolymerization and alkylation of the heterocyclic N-vinyl monomer moieties in the terpolymer with an $\alpha$-olefin or halo-$\alpha$-olefin and the isomeric distribution of the alkyl or haloalkyl groups in such moieties can be determined by a systematic quantitative study of the alkylated terpolymers prepared in accordance with the present invention and their thermally degraded products. Such study involves solvent fractionation, thermal degradation, elemental analysis, vapor phase chromatography (VPC), infrared (IR) and nuclear magnetic resonance (NMR) spectroscopy, all of which will be referred to hereinafter as "systematic quantitative study."

It will be readily appreciated by those skilled in the polymer art that in order to determine the reactivity ratios of the foregoing heterocyclic N-vinyl monomers, monoethylenically unsaturated polymerizable monomers, $\alpha$-olefins and halo-$\alpha$-olefins for terpolymerization purposes in each of the foregoing inert organic solvents and organic peroxide catalysts, at various temperature ranges and at various molar concentrations of the reactants, a tedious and time-consuming study is necessary to determine the approximate structure of each and every alkylated terpolymer resulting from the reaction.

As noted above, while the three (3) component mixture is being terpolymerized, the same $\alpha$-olefin or halo-$\alpha$-olefin alkylates one or more of the active sites of the heterocyclic N-vinyl monomer moiety and the other comonomer in the terpolymer. From our systematic quantitative study, we found that when one mole of a mixture containing from 5 to 99 mole percent of a heterocyclic N-vinyl monomer, wherein R and $R_1$ in the foregoing formulae are both hydrogen, and from 1 to 95 mole percent of a monoethylenically unsaturated polymerizable monomer (non-heterocyclic) is terpolymerized with as little as 0.05 mole to as high as 10 moles of $\alpha$-olefin or halo-$\alpha$-olefin per mole equivalent of the mixture, a minimum of 50% to as high as 100% of the $\alpha$-olefin or halo-$\alpha$-olefin is consumed in the terpolymerization and alkylation.

Our systematic quantitative study showed mono-, di-, and tri-alkylation of the heterocyclic N-vinyl monomer moieties in the terpolymer, as well as propagation of the $\alpha$-olefin or halo-$\alpha$-olefin on one or more of the active sites of said moieties. When 0.05 to 0.1 mole of $\alpha$-olefin or halo-$\alpha$-olefin is employed per mole equivalent of the comonomer mixture, mono-alkylation predominantly takes place at random positions in the heterocyclic N-vinyl monomer moiety as well as in the other comonomer of the terpolymer. In other words, when a small mole ratio of the $\alpha$-olefin or halo-$\alpha$-olefin is employed per mole equivalent of the comonomer mixture (i.e., two heterocyclic N-vinyl monomers or a heterocyclic N-vinyl monomer and polymerizable monoethylenically unsaturated monomer), monoalkylation of the comonomers is predominant. However, when a high mole ratio (greater than 1) of the $\alpha$-olefin or halo-$\alpha$-olefin is employed per mole equivalent of the comonomer mixture, di-, tri- and poly-alkylation of the comonomers is obtained. The following illustrations show how this random mono-alkylation takes place in the heterocyclic N-vinyl monomer moiety in the terpolymer:

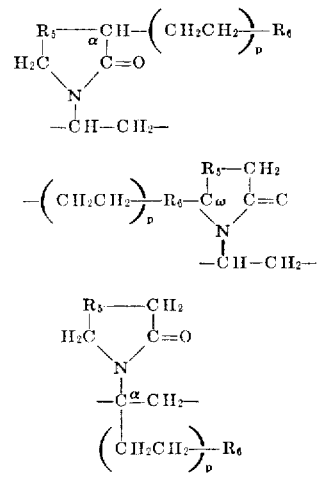

$R_5$ represents the atoms necessary to complete a 5-, 6- or 7-membered ring system, $R_6$ is either hydrogen or alkyl of from 1 to about 180 carbon atoms, and the $p$'s independently represent either 0 or 1; when $p$ is 0, $R_6$ is hydrogen; when $p$ is 1, $R_6$ is either hydrogen or alkyl of from 1 to about 180 carbon atoms.

Where the heterocyclic N-vinyl monomer in the comonomer mixture contains 1 or 2 alkyl groups of from 1 to 2 carbon atoms in the omega position, random monoalkylation does not take place in this position, but instead on the carbon atom alpha to the carbonyl and alpha-vinyl carbon atom.

When 0.1 to 10 moles of $\alpha$-olefin or halo-$\alpha$-olefin of at least 2 carbon atoms are employed per mole equivalent of the mixture of the two monomers, random monoalkylation, di-alkylation, tri-alkylation, as well as polyalkylation take place at the aforementioned positions of the heterocyclic N-vinyl moiety as well as in the other comonomer of the terpolymer chain.

Di-alkylation and tri-alkylation are exemplified with heterocyclic N-vinyl moieties by the following illustration:

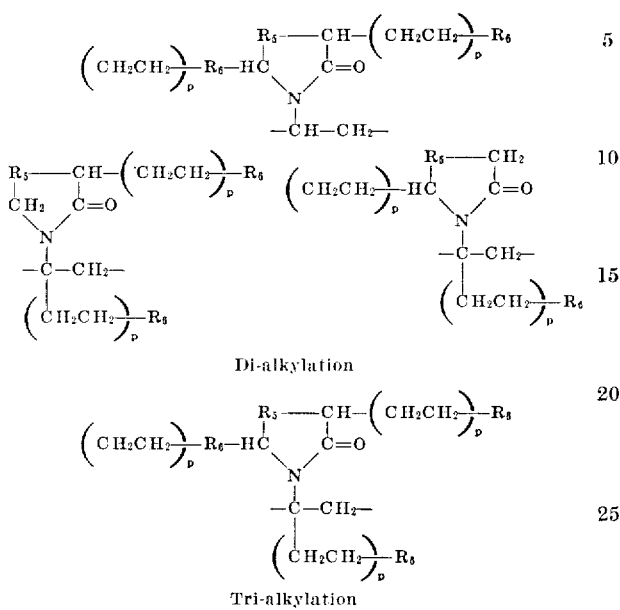

Di-alkylation

Tri-alkylation

Since propagation occurs at a given alkylation site, i.e., one or more additional moles of α-olefin or halo-α-olefin add to the first mole of α-olefin or halo-α-olefin which has added to the heterocyclic N-vinyl moiety and to the other comonomer, such propagation is termed polyalkylation as distinguished from mono-, di- and tri-alkylation. The tendency towards polyalkylation (propagation) increases as the ratio of α-olefin or halo-α-olefin to the heterocyclic N-vinyl moiety and other comonomer moiety increases and as the chain length of said α-olefin decreases. For example, when terpolymerizing and alkylating with ethylene, the molar ratio of ethylene propagated in the same positions (active sites) as above described for the isomeric 1:1 adducts may range from 3:1, 4:1, 5:1, and 6:1. This can be exemplified with the heterocyclic N-vinyl moiety by the following illustration:

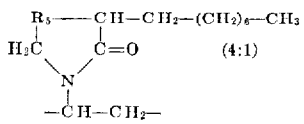

When one mole of a mixture consisting from 5 to 99 mole percent of a heterocyclic N-vinyl monomer, wherein R and $R_1$ in the foregoing formula are both hydrogen and from 1 to 95 mole percent of a monoethylenically unsaturated polymerizable monomer (non-heterocyclic, such as, for example, a vinyl ester, acrylic acid or its ester, N-substituted acrylamide, methacrylic acid ester and N-substituted methacrylamide, vinyl ketone, allyl cyanide, and other comonomers containing a reactive abstractable hydrogen atom, "proton," on a carbon atom adjacent to a carbonyl, nitrile, amide nitrogen or ester oxygen functionalities), is terpolymerized with 0.05 to 10 moles of α-olefin or halo-α-olefin, random mono-, di-, tri- and poly-alkylation take place at the aforementioned sites of the heterocyclic N-vinyl monomer moiety as well as on the carbon atoms α to the aforestated functionalities.

The random alkylation on the carbon atoms alpha to some of the aforestated functionalities of the non-heterocyclic monomer moiety in the terpolymer can be illustrated as follows:

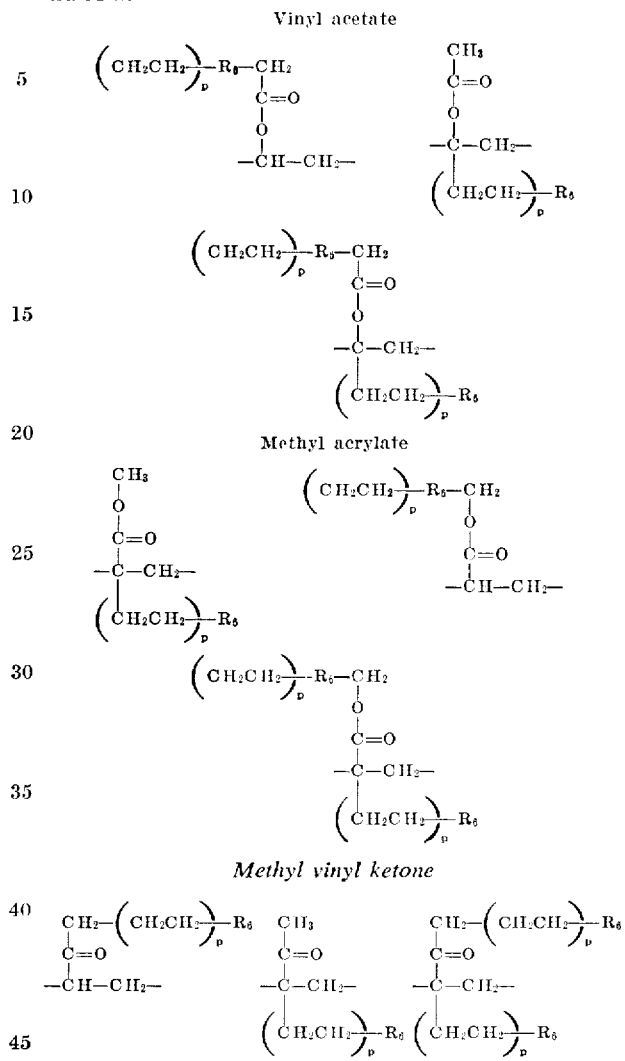

Vinyl acetate

Methyl acrylate

Methyl vinyl ketone

As regards the actual structure of the alkylated terpolymers prepared in accordance with the present invention, considerable difficulty was encountered due to the very complicated nature of the degraded fractions of the terpolymer and the difficulty in reaching a definite conclusion of the structure of the original terpolymer from the data obtained.

From our systematic study of the variety of alkylated terpolymers obtained by the process of the present invention, we found that small amounts of the α-olefin or halo-α-olefin used in the reaction is homopolymeried as well as copolymerized with each of the individual comonomers employed in the comonomer mixture.

The following examples will show how the various heterocyclic N-vinyl monomers, monoethylenically unsaturated polymerizable monomers and α-olefins or halo-α-olefins are terpolymerized and alkylated. All parts given are by weight unless otherwise noted.

EXAMPLE 1

Into a two-liter, four-necked flask equipped with stirrer, thermometer, nitrogen inlet and reflux condenser the following ingredients were charged:

| | Grams |
|---|---|
| N-vinyl-2-pyrrolidone (1.0 mole) (74%) | 111 |
| Vinyl acetate (0.45 mole) (26%) | 39 |
| α-hexadecene (1.5 mole) | 336 |
| Methyl isobutylcarbinol | 200 |
| Di-t-butyl peroxide (0.1 mole) | 15 |

11

After a thorough purge with nitrogen the contents were heated. At about 105° C. of pot temperature, a vigorous reflux of vinyl acetate (B.P. 72–73° C.) was observed and the temperature slowly increased as the refluxing decreased. The contents were maintained at 120–135° C. for 16 hours and then 10.0 more grams of the peroxide were added and the reaction continued for another 8 hours. (Total peroxide=25.0 grams or 0.17 mole.) The analysis of the solution showed the total absence of N-vinyl-2-pyrrolidone, and only 3.3% of α-hexadecene equivalent to 23.5 grams of the olefin. The product, after the removal of the solvent, was a clear viscous fluid having a molecular weight of 9,000 and is soluble in hexane, kerosene, mineral oil, and other non-polar solvents.

EXAMPLE 2

Into a one-liter, four-necked flask equipped with stirrer, thermometer, nitrogen inlet and reflux condenser, the following materials were charged:

|  | Grams |
|---|---|
| N-vinyl-2-pyrrolidone (0.27 mole) | 30 |
| Dimethylaminoethyl methacrylate (0.063 mole) | 10 |
| α-eicosene (0.57 mole) | 160 |
| Methyl isobutyl carbinol | 150 |
| Di-t-butyl peroxide (0.68 mole) (initial) | 10 |

The flask was then thoroughly purged with nitrogen and heated. A reaction temperature of 125–135° C. was maintained for 16 hours and then 5.0 more grams peroxide were added and the reaction continued for another 16 hours. (Total peroxide=15 grams or 0.1 mole.) After cooling, the contents were analyzed and found to contain no residual N-vinyl-2-pyrrolidone or the dimethylaminoethyl methacrylate and only 6.58% by weight as α-eicosene corresponding to 24 grams of the olefin. When the solvent was removed in high vacuum and substituted with 200 grams of lubricating oil of paraffinic stock having a Saybolt viscosity of 100 seconds (100 sec. solv.), a clear amber solution was obtained which solidified to a soft waxy solid on standing.

EXAMPLE 3

Into a one-liter, four-necked flask equipped with stirrer, thermometer, nitrogen inlet and reflux condenser, the following materials were charged:

|  | Grams |
|---|---|
| N-vinyl-2-piperidone (0.56 mole) | 70 |
| Ethyl methacrylate (0.26 mole) | 30 |
| α-eicosene (0.90 mole) | 252 |
| Methyl isobutylcarbinol | 200 |
| Di-t-butyl peroxide (0.68 mole) | 10 |

The reaction flask was then thoroughly purged with nitrogen and heated. When the temperature reached 115° C. an exotherm was experienced, but the temperature was controlled and maintained at 125–135° C. After 8 hours, 10 more grams peroxide were added (total peroxide=20 grams, 0.137 mole) and heating continued for another 16 hours (total time=24 hours). The contents were then analyzed and found to contain neither N-vinyl-2-piperidone or ethyl methacrylate and only 5.75% unreacted α-eicosene, corresponding to 32.8 grams of the α-olefin. The solvent was then stripped in vacuum and substituted with 352 grams 100 sec. solv. The resulting 50% solution in oil was clear viscous fluid and weighed 700 grams. However, the product solution on long standing solidified into a soft waxy solid.

EXAMPLE 4

Into a one-liter, four-necked flask equipped with stirrer, thermometer, nitrogen inlet and reflux condenser, the following ingredients were charged:

|  | Grams |
|---|---|
| N-vinyl-2-pyrrolidone (0.5 mole) | 55.5 |
| N-vinyl-3-morpholinone (0.5 mole) | 63.5 |
| Methyl isobutylcarbinol | 200 |
| α-octadecene (1.25 moles) | 315 |
| t-Butyl hydroperoxide (0.12 mole) | 11 |

The flask was purged with nitrogen thoroughly and heated. The contents were maintained at 120–140° C. for 12 hours and then 11.0 more grams of the hydroperoxide were added and heating continued for another 12 hours. (Total peroxide=22 grams or 0.24 mole.) In analysis of the contents, no trace of N-vinyl-2-pyrrolidone or N-vinyl-3-morpholinone was found but only the presence of 11.6% of α-octadecene was detected which indicates a residual of 76 grams unreacted olefin. The contents were then transferred into a two-liter flask and the solvent stripped in vacuum. The final product was a clear amber fluid weighing 426 grams.

EXAMPLE 5

Into a one-liter stainless steel shaker bomb was charged a composite solution of the following ingredients:

|  | Grams |
|---|---|
| N-vinyl-2-pyrrolidone (1.35 mole) | 150.0 |
| N-vinyl succinimide (0.4 mole) | 50.0 |
| Ethanol (solvent) | 300 |
| 2,5-dimethyl-2,5-di(t-butyl peroxy) hexane (0.075 mole) | 22.0 |

The bomb was purged with nitrogen, capped, and through its gas valve 150 grams (1.0 mole) of hexafluoropropylene was injected and sealed. The bomb was then heated with shaking and the contents maintained at 130–145° C. for twelve hours. After cooling and venting the bomb, the contents were poured into a four-liter beaker containing 1500 mls. of petroleum ether, with stirring. The precipitated polymer, after decanting the hydrocarbon layer, was washed twice more with hot 1000-ml. portions of petroleum ether and finally dried in a vacuum oven at 100–110° C. for 48 hours. The dried product which was a light yellow brittle solid weighed 292 grams at 98.9% solids. On analysis, it was found to contain 24.2% fluorine, corresponding to a product with 31.9% hexafluoropropylene by weight. The product thus obtained was soluble in alcohols, ketones, amides and forms a water insensitive film when cast on a glass plate from an ethyl alcohol solution. The alkylated terpolymer has a molecular weight of 16,000.

EXAMPLE 6

Into a one-liter four-necked flask equipped with stirrer, thermometer, nitrogen inlet and reflux condenser, the following materials were charged:

|  | Grams |
|---|---|
| N-vinyl caprolactam (0.54 mole) | 75.0 |
| Ethyl acrylate (0.75 mole) | 75.0 |
| n-Amyl alcohol (solvent) | 200 |
| Alpha-dodecene (1.34 moles) | 225.0 |
| Di-t-butyl peroxide (0.0685 mole) | 10.0 |

The flask was then purged with nitrogen and the contents heated while a mild nitrogen pressure was maintained on the flask. A slight exotherm was observed when the pot temperature reached 150° C., accompanied with vigorous reflux. But as the pot temperature increased, the rate of reflux decreased. The contents were maintained at reflux temperatures (125–135° C.) for eight hours and then a second addition of 15.0 grams peroxide was made (total=25.0 grams, 0.17 mole) and the refluxing continued for 22 more hours. At the end of this period, no residual N-vinyl caprolactam and ethyl acrylate could be detected on analysis. However, the residual α-dodecene was found to be 3.67% by weight of the solution, corresponding to 22.0 grams unreacted dodecene or 90.2% consumption of the α-olefin. The contents were then subjected to vacuum stripping with final stripping conditions of 130–140° C. pot temperature at 0.5–1.0 mm. Hg for one-half hour. The alkylated terpolymer product thus obtained is a clear amber viscous fluid and soluble in all non-polar solvents such as hydrocarbons and mineral oil, but still soluble in polar solvents such as alcohols, ketones, amides and esters.

EXAMPLE 7

Into a one-liter stainless steel shaker bomb, following a nitrogen purge, a solution of the following ingredients was charged.

|  | Grams |
|---|---|
| N-vinyl-5-methyl-2-pyrrolidone (0.96 mole) | 120.0 |
| N-acryloyl-2-pyrrolidone (0.288 mole) | 40.0 |
| 4-methyl-1-pentene (2.38 moles) | 200.0 |
| Ethanol (solvent) | 250.0 |
| Di-t-butyl peroxide (0.1 mole) (initial) | 15.0 |

The bomb was sealed, heated and maintained at 130–140° C. for 10 hours. It was then cooled to room temperature, vented and opened. After charging a second addition of 15.0 grams di-t-butyl peroxide (total=30.0 grams, 0.2 mole), the bomb was sealed again and heated. The contents were maintained at 130–140° C. for 12 hours. Finally, after cooling, the contents of the bomb were transferred into a one-liter, four-necked reaction flask and analyzed for residual monomers. No residual N-vinyl-5-methyl - 2 - pyrrolidone or N-acryloyl - 2 - pyrrolidone could be detected. However, residual 4-methyl-1-pentene was found to be 5.32% by weight of solution, corresponding to 34.0 grams of the α-olefin or an 83% consumption. The product-solution was subjected to stripping at atmospheric pressure initially and then in vacuum, with final conditions of 150–165° C. at 1–2 mm. Hg for one-half hour. The amber-colored viscous fluid remaining in the flask became a flexible solid on cooling. The product thus obtained weighed 305 grams and contained 5.57% nitrogen, corresponding to a product with 51 weight percent of the two heterocyclic comonomers or a hydrocarbon content of 49%. This product is soluble in a wide variety of polar and non-polar solvents ranging from alcohols, amides and ketones to mineral oil and petroleum ethers. However, it is insoluble in water.

From the foregoing specification and illustrative working examples, it becomes clearly evident that by the simultaneous terpolymerization and alkylation process of the present invention, it is possible to systematically control the solubility characteristics of the alkylated terpolymers by the mixture of the two monomers and α-olefin and by the amounts thereof so that terpolymers which are still soluble in polar solvents such as lower alcohols to terpolymers which are soluble in aliphatic hydrocarbons, mineral and lubricating oils can be obtained as well as terpolymers having intermediate degrees of solubility between polar and non-polar solvents. Thus, terpolymers with a low degree of alkylation can be obtained which are still soluble in ethanol so that they can be formulated with "Freons" as aerosol hair sprays, but their sensitivity to moisture is considerably reduced. For example, when one mole of two different heterocyclic N-vinyl monomers of the foregoing type and in the aforestated proportions, or one mole consisting from 50 to 99 mole percent of a heterocyclic N-vinyl monomer and from 1 to 50 mole percent of a polymerizable mono-ethylenically unsaturated monomer, are terpolymerized and alkylated with ethylene, propylene or 1-butene to the extent of 15% to 30% α-olefin by weight, alkylated terpolymers are obtained which are soluble in anhydrous ethanol and are readily formulated with "Freons" as aerosol hair sprays having increased moisture resistance. Films of such alkylated terpolymers are more flexible and less tacky under high humidity conditions than conventional homopolymers of such heterocyclic N-vinyl monomers or heterocyclic N-vinyl monomer/vinyl acetate copolymers. The flexibility of the alkylated terpolymers increases and the tack at high humidity decreases as the degree of alkylation increases. These alkylated terpolymers can also be formulated into adhesives with superior properties because of their increased moisture resistance.

Terpolymers with a high degree of alkylation are soluble in lubricating oils and are useful as additives which not only improve the viscosity index, but also impart excellent sludge and corrosion inhibiting properties. They are also compatible at all levels with epoxy resins, polystyrene, polyvinyl acetate, and with copolymers of vinyl chloride and vinyl acetate.

The alkylated terpolymers in which at least 25 mole percent of the comonomer moieties in the terpolymer are alkylated on the average by at least one alkyl substituent of from 10 to 42 carbon atoms, display emollient properties, i.e., softening and soothing effect when applied to the skin and the appendages of the skin. In view of this characteristic, they are excellent additives to soaps and cosmetic preparations of the cleansing, conditioning and embellishing type which will impart a smooth texture as well as a softening and soothing effect to the skin and skin appendages. The alkylated terpolymers can be used in place of, and in addition to, petroleum hydrocarbons, i.e., mineral oils, petrolatums and paraffin waxes. They are not only soluble in these petroleum hydrocarbons, but also soluble in other unctuous materials such as fatty acids; stearic, myristic oleic acids, etc.; glyceryl monostearate (Glycosterin); lanolin (wool fat); beeswax and other animal and vegatable waxes; higher alcohols, such as hexanol, myristyl alcohol, etc.; polyoxyalkylene glycols, e.g., polyoxyethylene glycol, polyoxypropylene glycol; methyl ethyl ketone, Cellosolve, butyrolactone, etc., which are employed in toiletry preparations of this type. They are readily emulsified by the usual reagents employed in toiletry manufacture. By virtue of this solubility, emulsifiability and broad compatibility with other components of the toiletry preparation, they substantially reduce or eliminate the drying tendency of mineral oils and petrolatums present in such preparations. The presence of the additive (alkylated terpolymer) in toiletry preparations containing paraffin wax eliminates the clogging of pores. Regardless whether the toiletry preparation contains any one or all of these petroleum hydrocarbons, vegetable oils, lanolin, and/or other unctuous components, or is free from such components, etc., the presence of the additive in such preparation imparts a much smoother texture to it with the attendant softening and soothing effect when applied to the skin and a softening effect when applied to skin appendages.

The amount of alkylated terpolymer that is employed to effect the desired results (smoother texture with softening and soothing effects) ranges from about 0.1% to about 50% by weight based on the total weight of the completed toiletry preparation. The alkylated terpolymers are added at any stage of manufacture of cold creams, cleansing creams, emollient creams, finishing creams, skin-softening lotions, hand cleaners, lubricating creams, overnight creams, absorption-base creams, hand creams and lotions, foot creams, baby creams, baby skin oils; special creams, such as astringent creams, bleaching creams, acne creams; protective creams (industrial creams), lotion or aerosol skin protective coatings, aerosol bandage sprays, vanishing creams, foundation creams, brushless shaving creams, shaving preparations, after-shave lotions and sprays, medicated creams, deodorants and anti-perspirants, such as deodorant creams and lotions, roll-on deodorants, sunburn preventatives, suntan preparations, paste or lotion rouges, cream rouges, massage oils, facial masks, depilatories, i.e., hair removers (epilating wax compositions) and hair removing creams, paste or lotion face makeup, face powders; eye makeup, i.e., eye shadow and eyebrow creams; fingernail creams and cleaners, hair bleaches and tints, cuticle softeners, hair conditioners, wave sets, hair dressings, hair brilliantines; hair oils, hair sprays, creams and shampoos, nail polish removers, lipsticks, perfume sticks, facial soaps, synthetic soap bars, antiseptic soaps (tincture of green soap), insect repellents, protective hand creams, waterless hand cleaners, dentifrice, pet shampoos, bath talcs, and the like. They are helpful in stablizing aqueous foams in toiletry preparations such as soap bars, shaving creams, etc.

Toiletry preparations containing the alkylated terpolymer render the preration smooth in texture and easier in application to the skin and its appendages (hair and nails). After application to the skin or scalp, the preparations leave the skin soft and pliable with a soothing effect which remains after the preparation is removed by washing with soap and water. After application to the hair, the preparation deposits a film which renders the hair smooth, soft, lustrous and alive-looking. The soft and smooth effects remain after washing with soap and water and enhance the manageability of the hair. After application of the nail preparations, the nails are smooth and the adjacent skin rendered soft and pliable with a soothing effect. The alkylated terpolymers are effective pigment dispersers and act as color receptors in rouges and lipsticks.

In hair preparations the presence of the alkylated terpolymer improves the softness, water repellency and manageability of the hair. In hair conditioners, the alkylated terpolymers may be added to creams, foams or gels and the resulting preparations pressurized with nitrogen, argon, or the usual liquefied fluorochloro-hydrocarbons.

In view of their solubility in hydrocarbons, mineral oils, etc., the alkylated terpolymers are particularly adaptable for use as hot melts alone or in combination with paraffin waxes as coatings for various fibrous materials. Extruded films from such alkylated terpolymers, either alone or with waxes and resins, may be composited to paper and other fibrous or textile materials. The alkylated terpolymers are compatible with a wide variety of resins, waxes, and polymers at room or elevated temperatures. They are useful as binders and saturants in hard board and particle board.

Terpolymers, in which at least 60% of the comonomer moieties alkylated on the average by an alkyl group of from 18 to 42 carbon atoms, are useful for the protection of wires and cables in the form of outer jackets and sheets. Films or coatings of such alkylated terpolymers are also useful as liners for metal or fiber drums for shipping moist, dusty or corrosive products. They are also useful in electrical equipment such as in electric cable insulation, in potting dopes for capacitor elements, and as insulating coatings, sealing compounds, and in moisture-proofing coils, resistors and paper capacitors; as caulking compounds, spreader-sticker for insecticidal compositions, water-proofing sealants, adhesives, water-proofing, gum and resin plasticizers, paper coatings, metal rolling and as dispersants for inks and dye pastes. They are useful in leather treatment, as dye assistants, dye stripping agents, textile water-proofing, textile warp size, and the like.

Emulsions of the alkylated terpolymers are especially useful in the impregnation of paper. When mixed in amounts ranging from about 1 to 3% by weight in light mineral oils, the alkylated terpolymers function effectively as penetrants in the removal of rusty and frozen nuts and bolts.

The alkylated terpolymers are especially adaptable in dye stripping, as pigment dispersants and protective colloids, temporary protective coatings, coatings for paper, binders for detergent briquettes and as binders for tablets and as color dispersants in tablet coating. Films of the alkylated terpolymers, from aqueous dispersion or emulsion, are effective for spraying various plants so as to protect them during transplanting or prevent rapid transpiration during sunny and relatively warm winter months.

The alkylated terpolymers are useful in dispersing gums, resins and various types of polymers. They are particularly adaptable in lubricating oils as sludge dispersers, and as bonding agents for paper, plastics and textile fabrics. They are very useful as anti-redeposition agents in detergents, as detergent hydrotropes and/or pacifiers, in dry cleaning detergents, foam stabilizers for shampoos, stabilizers for high density and low density liquid detergents, foam stabilizers for mist drilling of oil or gas wells, latex stabilizers, hydraulic fluid emulsion stabilizers, suspending agents and protective colloids for polymer emulsions and in emulsion polymerization reactions, inhibitors for clay hydration slushing, oil corrosion inhibitors, engine oil rust inhibitors, complexing agents for liquid-liquid extraction, dye receptors for polypropylene, dye fixing agents, pigment dispersants and protective colloids in pigment printing, fluidizing agents for paper coating slurries, pitch dispersant; adhesives in place of starch, casein, synthetic latices and the like; anti-static agents for polystyrene, polyethylene, polypropylene and other plastics, tackifiers for polyolefins and other plastics, flexibilizing agents for phenolic and other thermo-setting resins, dispersants and gloss improvers in floor wax polishes, thickening agents in non-aqueous systems, as membranes for desalting and filtration, and as adhesion promotors for paperboard to nylon and as dye receptors for Creslan. They are useful as additives to natural and synthetic waxes to lower melt viscosity, improve dispersibility, flexibility, gloss, or hardness. They are useful as ink acceptors for surface printing of high density polyethylene bottles, absorbents for tobacco tars in cigarette filters, absorbents for toxic gases and vapors; complexing agents for dyestuffs, phenolic compounds and heavy metal ions; thickeners for petroleum oils and oil based paints; flocculating agents in sewage treatments, as coating for adhesive tapes and as components in adhesive hot melts, melting point depressants for natural and synthetic resins, as reinforcing agents for glues and as reducers of the hydrophilic character of polar resins.

The alkylated terpolymers are excellent dye receptors for polyolefin fibers such as polyethylene, polypropylene and polybutene. They are also excellent for sizing polypropylene filament and spun yarns in view of their good adhesive properties on polypropylene surfaces. They add strength and good dyeing properties when employed with rayon, both viscose and acetate. They are excellent sizers for glass fibers since they have the adhesion due to the heterocyclic N-vinyl units but better lubricity because of the added alkyl units. The alkylated terpolymers improve the gloss of waxes and polishes. They are better soil-suspending agents than the corresponding unalkylated copolymers in synthetic detergents. They are especially useful in the de-emulsification of crude oil emulsions. They are useful as soil-dispersing agents for synthetic fibers. In the textile industry, they are useful as adhesives, anti-static agents, lubricants, dye assistants, dye leveling agents and as filament spinning finishes. They are also useful as tackifiers, plasticizers, flocculators of ore fines, etc., as gelling agents and as beverage clarifiers.

The alkylated terpolymers display dispersing and detergent properties when incorporated into petroleum products at a concentration of about 0.03% to 5% by weight, such as kerosene, fuel oils, jet fuels and other combustible hydrocarbon liquids. They readily disperse gums, resins (asphaltenes) in such products.

The alkylated terpolymers are also useful as mold release lubricants, as anti-tack and anti-block agents, as lubricants and anti-static agents for films and textile fibers, and as flattening, softening and sizing agents for textiles. They are compatible with petroleum resins and the mixture employed in water-proofing, pipe coating compounds, and as concrete curing compounds to insure the deposition of a water-proof membrane. In carbon paper, the alkylated terpolymers serve as a vehicle for carrying the color and prevent the ink from soaking completely into the paper.

The alkylated terpolymers for halogen adducts with elemental iodine, iodine monochloride and iodine monobromide. The iodine adducts are prepared by gently heating the alkylated terpolymer until it melts and with constant stirring adding elemental iodine or a solution of elemental iodine in alcohol or carbon tetrachloride or a mixture thereof. From 1 to 12% of iodine by weight of alkylated terpolymer may be incorporated to the molten terpolymer. The resulting iodine adduct is soluble or dispersible in a pharmaceutical grade mineral oil and other unctuous materials. The iodine adduct may be incorporated in powders, ointments, salves, suppositories, and toiletry preparations (cosmetics and soaps) to yield antiseptic and germicidal composition which impart a soft, smooth and soothing effect to the skin.

The alkylated terpolymers are useful additives to automobile polishes to increase gloss and as rust inhibitors in priming and finishing paints for metals. The alkylated terpolymers are readily chlorinated by conventional procedures to yield a new and useful class of terpolymers having fire-retarding properties.

The alkylated terpolymers when incorporated into non-anionic and anionic surfactants in amounts ranging from about 3 to 5% by weight of the surfactant, counteract the defatting tendencies and the accompanying chapping appearance when in contact with human skin, by leaving the skin soft and pliable with a soothing effect, which remains after several rinsings of water.

While the present specification has shown the simultaneous terpolymerization and alkylation with α-olefins and halo-α-olefins of a large class of heterocyclic N-vinyl monomers in the comonomer mixture, N-vinyl lactams other than those specifically illustrated above may be employed in the comonomer mixture in the aforestated mole percent proportions in the terpolymerization with an α-olefin or halo-α-olefin of at least two carbon atoms. Such monomers include N-vinyl alkyl-substituted derivatives of lactams; for example, 4,4-dimethyl-2-pyrrolidone; 3,3-dimethyl-2-pyrrolidone; 3-ethyl-2-pyrrolidone; 3,5-dimethyl-2-pyrrolidone; 3-methyl-2-pyrrolidone; 4-methyl-2-pyrrolidone; 3,3,5-trimethyl-2-pyrrolidone; 5,6-dimethyl-2-piperidone; 4-ethyl-2-piperidone; 3-methyl-6-ethyl-2-piperidone; 3-methyl-2-piperidone; 4-methyl-2-piperidone; 3,6-dimethyl-2-caprolactam; 4,6-dimethyl-2-caprolactam; 4,7-dimethyl-2-caprolactam; 3-ethyl-2-caprolactam; 5-ethyl-2-caprolactam; 6-ethyl-2-caprolactam; 4-ethyl-6-methyl-2-caprolactam; 6-methyl-2-caprolactam; 4-methyl-6-ethyl-2-caprolactam; 3-methyl-2-caproloctam; 4-methyl-2-caprolactam; and 6-methyl-2-caprolactam. Despite the fact that some of these monomers contain an alkyl group in either alpha and/or omega positions to the carbonyl, any one of the latter two positions free from such alkyl substituents as well as the apha-vinyl carbon atom will nevertheless be terpolymerized and alkylated to yield terpolymers containing at least one additional alkyl substituent of at least 2 carbon atoms in the lactam moieties of said terpolymers.

The haloalkylated terpolymers of monohalo- and polyhalo-α-olefins of at least two carbon atoms are also a new and useful class of products having fire-retardant properties. They are especially useful in the formulation of fire-retardant adhesives, i.e., bonding agents for paper, plastics and textile fabrics. From solutions in a variety of organic solvents or as emulsions, the haloalkylated terpolymers form smooth continuous films which make them particularly useful as fire-retardant pre-coating agents for polyester laminates.

We claim:
1. Alkylated terpolymer consisting of a herterocyclic N-vinyl monomer having a carbonyl function adjacent to the nitrogen in its heterocyclic moiety, a monoethylenically unsaturated polymerizable monomer other than α-olefin and an α-unsaturated olefin comonomer of from 2 to about 180 carbon atoms, said terpolymer having a polymer chain consisting essentially of recurring moieties having the following formulae:

(a)
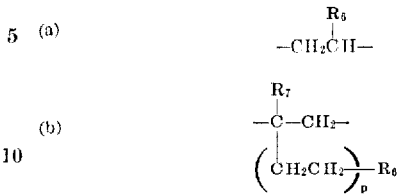

(b)

and (c) one selected from the class consisting of those having the following formulae:

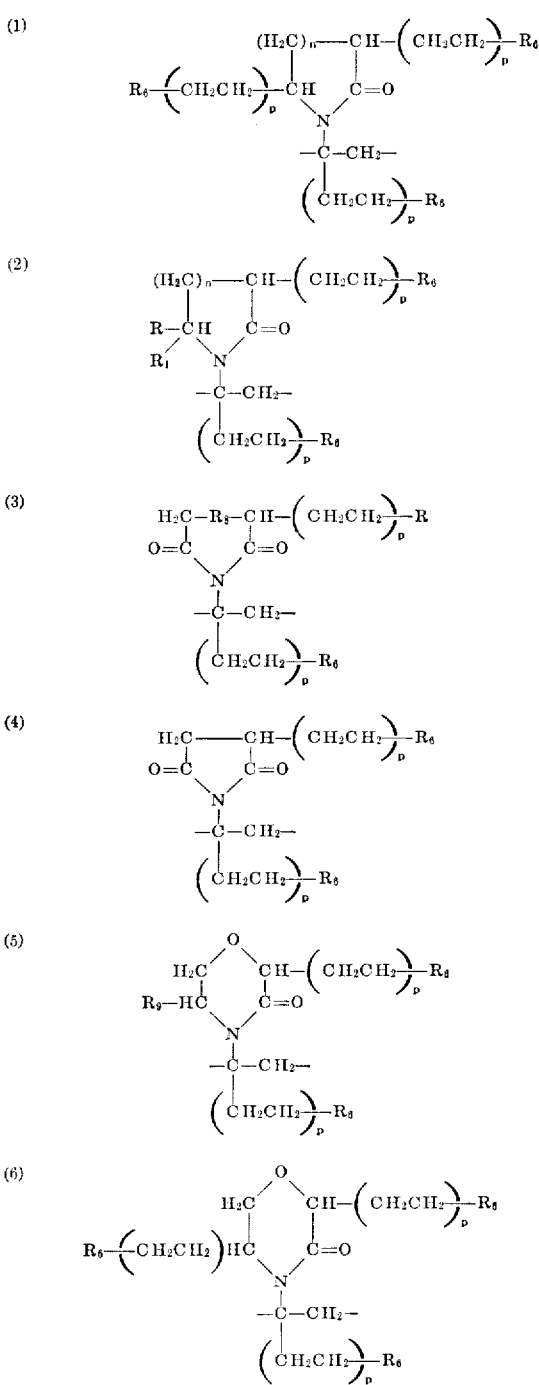

(7) 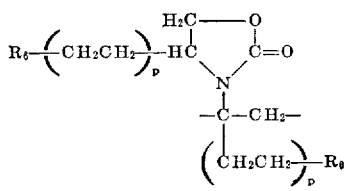

wherein R and $R_1$ are selected from the group consisting of hydrogen, methyl and ethyl, $R_6$ is selected from the group consisting of hydrogen and alkyl of from 1 to about 180 carbon atoms $R_7$ represents the nonpolymerizable residue of said monoethylenically unsaturated polymerizable monomer selected from monomers consisting of acrylamides, acrylic acid and acrylic acid esters, acrylonitrile, allyl alcohol, allylamine, allyl cyanide, methacrylic acid and methacrylic acid esters, vinyl cyclohexane, vinyl esters, vinyl methyl ketone, viny pyridine and styrene, $R_8$ is a member selected from the class consisting of a methylene and oxy group, $R_9$ is selected from the group consisting of methyl and ethyl, $n$ is an integer of from 1 to 3, and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties (b) and (c) has the value of 1, and wherein the mole ratio of recurring moieties (a) and the corresponding group $—(CH_2CH_2)_p R_6$ in said recurring moieties (b) and (c) is from 0.5 to 10 moles per 1 mole of the mixture of moieties consisting of 1 to 95 mole percent of moiety (b) and from 5 to 99 mole percent of moiety (c).

2. Alkylated terpolymer according to claim 1 wherein the recurring moiety (c) in the polymer chain has the following formula:

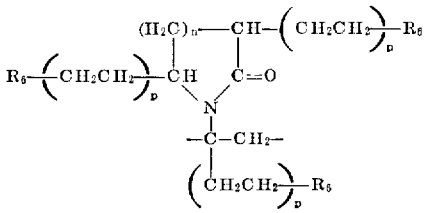

wherein $R_6$ is selected from the group consisting of hydrogen and alkyl of from 1 to about 180 carbon atoms, $n$ is an integer of from 1 to 3, and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties of said formula has the value of 1.

3. Alkylated terpolymer according to claim 1 wherein the recurring moiety (c) in the polymer chain has the following formula:

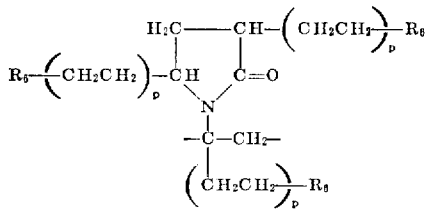

wherein $R_6$ is selected from the group consisting of hydrogen and alkyl of from 1 to about 180 carbon atoms, and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties of said formula has the value of 1.

4. Alkylated terpolymer according to claim 1 wherein the recurring moiety (c) in the polymer chain has the following formula:

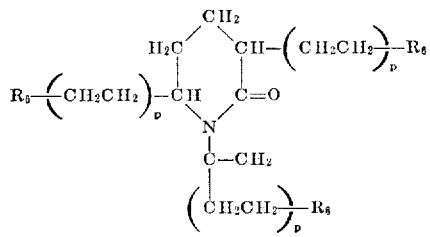

wherein $R_6$ is selected from the group consisting of hydrogen and alkyl of from 1 to about 180 carbon atoms and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties of said formula has the value of 1.

5. Alkylated terpolymer according to claim 1 wherein the recurring moiety (c) in the polymer chain has the following formula:

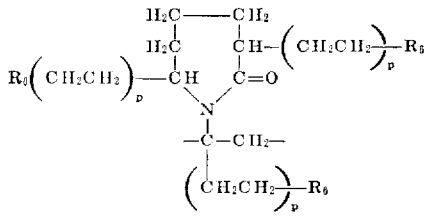

wherein $R_6$ is selected from the group consisting of hydrogen and alkyl of from 1 to about 180 carbon atoms and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties of said formula has the value of 1.

6. Alkylated terpolymer according to claim 1 wherein the recurring moiety (c) in the polymer chain has the following formula:

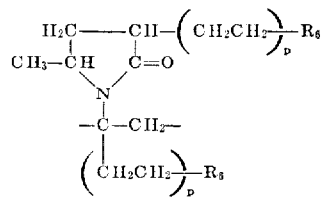

wherein $R_6$ is selected from the group consisting of hydrogen and alkyl of from 1 to about 180 carbon atoms and the $p$'s independently represent a numerical value of 0 to 1; when $p$ is 0, $R_6$ is hydrogen; when $p$ is 1, $R_6$ is selected from the group consisting of hydrogen and alkyl of from 1 to about 180 carbon atoms and wherein at least one of the $p$'s in at least one of the recurring moieties of said formula has the value of 1.

7. The process of preparing alkylated terpolymers by simultaneous terpolymerization and alkylation which comprises heating one mole of a mixture of monomers containing from about 5 to 99 mole percent of a 5- to 7-membered heterocyclic N-vinyl monomer having a carbonyl function adjacent to the nitrogen in its heterocyclic moiety and from about 1 to 95 mole percent of a monoethylenically unsaturated polymerizable monomer selected from the class consisting of acrylamides, acrylic acid and acrylic acid esters, acrylonitrile, allyl alcohol, allylamine, allyl cyanide, methacrylic acid and methacrylic acid esters, vinyl cyclohexane, vinyl esters, vinyl methyl ketone, vinyl pyridine and styrene with 0.05 to 10 moles of α-unsaturated olefin comonomer selected from the class consisting of α-olefin of from 2 to about 180 carbon atoms, monohalo- and polyhalo-α-olefin of from 2 to 6 carbon atoms in solution of an organic solvent common to the said mixture of monomers and α-unsaturated olefin comonomer in the presence of 0.025 to 0.30 mole of an organic peroxide catalyst per mole of said α-unsaturated olefin at a temperature ranging from 80° to 200° C., said 5- to 7-membered heterocyclic N-vinyl monomer being selected from the class consisting of N-vinyl lactam, N-vinyl succinimide, N-vinyl diglycolylimide, N-vinyl glutarimide, N-vinyl-3-morpholinone, N-vinyl-5-methyl-3-morpholinone, N-vinyl-5-ethyl-3-morpholinone and N-vinyl oxazolidone.

8. The process according to claim 7 wherein the said heterocyclic N-vinyl monomer is N-vinyl lactam.

9. The process according to claim 7 wherein the said heterocyclic N-vinyl monomer is N-vinyl-2-pyrrolidone.

10. The process according to claim 7 wherein the said heterocyclic N-vinyl monomer is N-vinyl-2-piperidone.

11. The process according to claim 7 wherein the said heterocyclic N-vinyl monomer is N-vinyl-ε-caprolactam.

12. The process according to claim 7 wherein the said heterocyclic N-vinyl monomer is N-vinyl-5-methyl-2-pyrrolidone.

References Cited

UNITED STATES PATENTS

| 2,667,473 | 1/1954 | Morner et al. | 260—88.3 |
| 2,821,519 | 1/1958 | Glickman | 260—88.3 |
| 3,003,845 | 10/1961 | Ehlers | 260—88.1 |
| 3,174,955 | 3/1965 | Black | 260—88.3 |

JOSEPH L. SCHOFER, *Primary Examiner.*

H. WONG, JR., *Assistant Examiner.*

U.S. Cl. X.R.

260—33.2, 33.4, 33.6, 32.6, 32.8, 32.4, 326.5, 80.72, 47, 878, 875, 882, 886, 885; 424—47, 59, 65, 69, 63, 61, 49; 252—107, 331, 117, 56, 54.6, 51.5, 50, 52; 117—122, 138.8, 155, 139.5; 161—247; 260—28.5